March 23, 1965
G. D. HUNT
3,174,339
DIRECT READING PSYCHROMETER
Filed Jan. 22, 1962
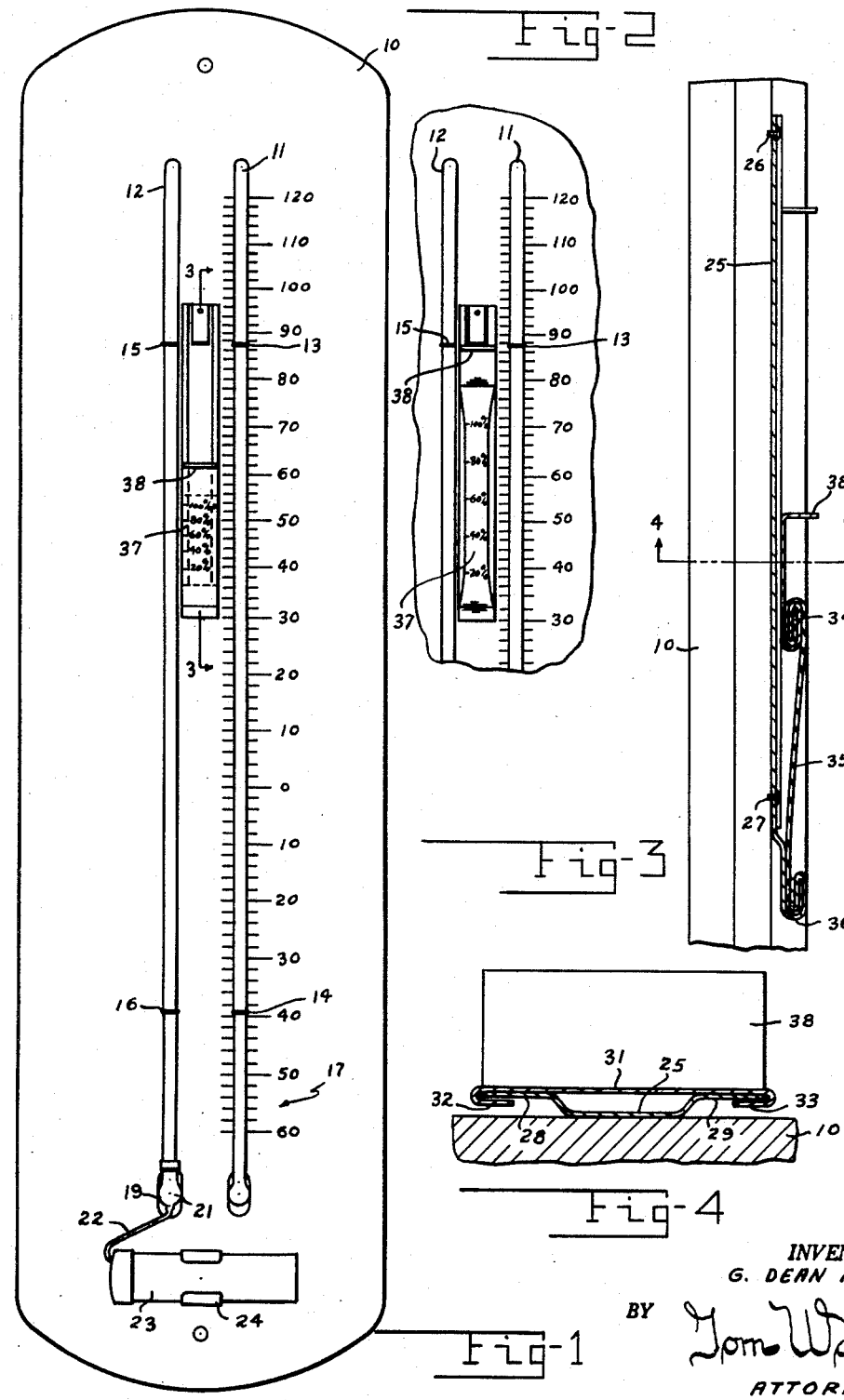
INVENTOR.
G. DEAN HUNT
BY Tom Walker
ATTORNEY

3,174,339
DIRECT READING PSYCHROMETER
George Dean Hunt, Springfield, Ohio, assignor to The Ohio Thermometer Company, Springfield, Ohio, a corporation of Ohio
Filed Jan. 22, 1962, Ser. No. 167,627
8 Claims. (Cl. 73—338)

This invention relates to instruments of hygrometry and particularly to a direct reading psychrometer.

A psychrometer provides in a single instrument a dry bulb thermometer and a wet bulb thermometer, the difference in the readings of the two being known as the wet bulb depression. From this information the relative humidity in the instrument environment is determinable, this being accomplished in the past through application of tested formulas or by reference to special tables.

The object of the invention is to simplify the construction as well as the means and mode of operation of psychrometers, whereby such instruments may not only be economically manufactured, but will be more efficient and satisfactory in use, adaptable to a wide variety of applications, and be unlikely to get out of order.

An object of this invention is to obviate the need for calculation and for reference to tabular material in the obtaining of relative humidity percentages, it being proposed to adapt a psychrometer for direct indication and reading of such information.

Another object of the invention is to present a new instrument of hygrometry in the form of a direct reading psychrometer.

A further object of the invention is to provide a direct reading psychrometer as described featuring an elastic percentage scale compensating automatically for increasing wet bulb depressions caused by rising dry bulb temperatures.

Still another object of the invention is to present a psychrometer of general utility in which the feature of direct reading is incorporated in a modification of simple construction and use.

A further object of the invention is to provide a psychrometer possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings or their equivalents.

Referring to the accompanying drawing wherein is shown one but obviously not necessarily the only form of embodiment of the invention.

FIG. 1 is a view in front elevation of a psychrometer in accordance with the illustrated embodiment of the invention;

FIG. 2 is a fragmentary view of FIG. 1, showing the elastic percentage scale extended to obtain a reading of relative humidity;

FIG. 3 is a detail view, taken substantially along the line of 3—3 of FIG. 1; and FIG. 4 is a detail view in cross section taken substantially along the line 4—4 of FIG. 3.

Like parts are indicated by similar characters of reference throughout the several views.

Referring to the drawings, the invention is disclosed as embodied in a wall mounted psychrometer, it being understood that the invention is applicable to psychrometers generally including bench and table supported laboratory and professional types.

In accordance with the illustrative embodiment of the invention an elongated support member 10 is adapted to be hung or otherwise attached to a wall. It provides a mounting for a dry bulb thermometer 11 and a wet bulb thermometer 12 which are arranged on the support 10 in side by side laterally spaced relation. Suitable means such as bands 13–14 and 15–16 hold the respective thermometers to the support 10. While independent readings of the dry bulb and wet bulb temperatures are not a necessary part of the psychrometer as here contemplated, support 10 may serve further as a scale plate. A column 17 of temperature graduations is in the illustrated instance, inscribed or imprinted on the support in adjacent cooperative relation to the dry bulb thermometer 11.

The thermometers 11 and 12 are conventional in construction and operation. Thus each comprises a slender closed glass tube forming a small diameter bore originating at the bottom of the tube in a bulb filled with mercury, alcohol or the like. The liquid forms a column in the tube rising and failing in response to sensed heating and cooling effects. The bulb 18 of thermometer tube 11 is dry or exposed to environmental atmospheric conditions. Thermometer 11 hence senses the air temperature of the instrument environment, and the liquid column therein assumes a position responding to and indicating such temperature. The bulb 19 of thermometer 12 is covered by a boot 21 of a saturable wicking or like material connected by a small bore connector 22 to a liquid filled vial 23. The latter is held by a clip 24 to the support 10 and provides a reservoir from which liquid may flow by capillary action to the boot 21, wetting the fabric thereof. The evaporation which takes place from boot 21 has a cooling effect on bulb 19 so that the column of liquid in thermometer 12 tends to indicate a lower temperature than does the column in thermometer 11. The indicated temperature of the wet bulb thermometer may be considered a temperature of evaporation. The difference between the indicated dry bulb and indicated wet bulb temperatures is the wet bulb depression and is a function of a combination of variable atmospheric conditions including air temperature and vapor content.

The wet bulb depression is bridged, in accordance with this invention, by a scale giving a direct reading of relative humidity. Longitudinally disposed between the thermometers 11 and 12 is a guide plate 25 secured as by screws 26 and 27 to the support 10. The side margins of the plate 25 are offset to define flanges 28 and 29. A slide 31 has side margins 32 and 33 bent over the flanges 28 and 29 in such manner as to mount the slide on plate 25 for relative motion in a vertical sense. At the bottom of slide 31 is a tongue 34 interfolded with one end of a flexible elastic strip 35 in a manner to interlock the slide with said strip. At its other end the strip 35 is similarly engaged with a projecting tongue 36 on the plate 25.

The strip 35 is ribbon-like in shape and is made of a good quality elastic material such as gum rubber, to have a long useful life with consistent deflection under stretch. On the outwardly facing side thereof are longitudinally spaced graduations 37 representing different percentages, the strip serving as an elastic scale for the reading of relative humidity percentages.

The guide plate 25 is mounted on support 10 to locate the elastic scale in a selected dry bulb temperature range of greatest interest and use. In a normal, untensioned condition of the strip the scale thereon gives no predetermined reading. To bring about a reading, slide 31 is grasped, as by its bent over extremity 38, and lifted upwardly along guide plate 25. This motion is continued, with a consequent stretching of strip 35, until a selected index location on the strip is brought to the level of the indicated dry bulb temperature as shown by thermometer 11. Such index location is in the illustrated instance, the 100% graduation on the elastic scale. The wet bulb depression is thus in effect measured, the percentage graduation on the elastic scale falling opposite or at the indicated wet bulb temperature on thermometer 12 representing the percentage of relative humidity.

The instrument of the invention accordingly uses an elastic percentage scale to compensate for increases in the wet bulb depression with rising dry bulb temperatures. The elastic scale strip 35 is so constructed that the calibrated portion of the scale is of such proper proportion of the total elastic length that such portion is extended the necessary amount to compensate for increased wet bulb depressions at the more elevated dry bulb temperatures. The graduations of the scale are approximately equally spaced from one another and maintain such relative spacing under stretch. Possibility of error introduced as a result of the narrowing of the strip which takes place near the ends thereof under stretch is reduced by judicious selection of strip in a portion producing the desired proportional stretching.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a psychrometer presenting a support and wet bulb and dry bulb thermometers in side by side relation thereon; direct reading means including a percentage calibrated elastic scale disposed in a sense longitudinally of said thermometers and anchored at its lower end to said support, and a longitudinally adjustable slide on said support to which the upper end of said scale is attached, said slide being movable upward to position an index location on said scale at the dry bulb temperature, and provide a reading of relative humidity adjacent the wet bulb temperature.

2. In a psychrometer presenting a support and wet bulb and dry bulb thermometers in side by side relation thereon; means slidable on said support in a sense longitudinally of said thermometers, an elastic scale attached at one end to said slidable means and anchored at its other end to said support, said scale having an index location thereon positionable by adjustment of said slidable means at the indicated dry bulb temperature and having further percentage indications giving at the level of the indicated wet bulb temperature a direct reading of relative humidity.

3. In a psychrometer presenting a scale plate and wet bulb and dry bulb thermometers mounted thereon; slide means movable on said scale plate for adjustment longitudinally of said thermometers, a strip of elastic material anchored at one end to said plate and connected at the other end to said slide means, said strip having an index location thereon positionable by movement of said slide means at the indicated dry bulb temperature, the movement of said slide means producing a selective stretch of said elastic strip, and longitudinally spaced apart percentage indications on said strip providing at the indicated wet bulb temperature a direct reading of relative humidity, said percentage indications being calibrated to utilize elongation of said strip to compensate for increased wet bulb depressions at elevated dry bulb temperatures.

4. In a psychrometer presenting a support and wet bulb and dry bulb thermometers in side by side relation thereon; scale means on said support in the form of an elastic strip longitudinally disposed between said thermometers, said strip having a calibrated portion displaying graduations corresponding to percentages of relative humidity, said strip being anchored at its lower end to said support and said calibrated portion encompassing a given part of the length of the dry bulb thermometer in an unstretched condition, and a slide movably mounted on said support and connected to the upper end of said strip said slide being liftable to stretch said strip whereby to cause the calibrated portion thereof to encompass a greater length of the dry bulb thermometer, a reading of relative humidity being taken by lifting said slide to bring the high percentage graduation on said strip to the level of the indicated temperature on the dry bulb thermometer whereupon the percentage graduation at the level of the indicated temperature on the wet bulb thermometer provides the desired reading.

5. A psychrometer according to claim 4, characterized in that said calibrated portion of said strip is centrally disposed of the strip, said portion extending proportionally under applied stretch conditions for uniform accurate compensation of increases in the wet bulb depression.

6. In a psychrometer presenting wet bulb and dry bulb thermometers in side by side relation, elastic scale means having means in connection therewith for stretch thereof from a reference point between and in a sense logitudinally of said thermometers, means defining an index on a portion of said scale means remote from said reference point, said scale means having graduations spaced longitudinally thereof from said reference point to said iindex, each indicative of a predetermined percentage of relative humidity and so arranged as said scale means is stretched to position said index in correspondence with the level of temperature indication on the dry bulb thermometer to provide thereon a direct reading of the existing percentage of relative humidity at a position in correspondence with the level of the temperature as indicated on the wet bulb thermometer.

7. In a psychrometer presenting a support and wet bulb and dry bulb thermometers in side by side relation on said support, scale means longitudinally movable on said support relative to said thermometers, said scale means having an index location positionable at the indicated dry bulb temperature and having percentage graduations spaced apart lengthwise thereof readable adjacent the indicated wet bulb temperature to provide an indication of relative humidity, said scale means being elastic and the portion of the scale calibrated with said graduations being in such proportion to the total elastic length of the scale as to enable said portion to be extended in compensation for increases in extent of the wet bulb depression.

8. In a psychrometer presenting a support and wet bulb and dry bulb thermometers in side by side relation on said support, scale means longitudinally movable on said support relative to said thermometers, said scale means having an index location positionable at the indicated dry bulb temperature and having percentage graduations spaced apart lengthwise thereof readable adjacent the indicated wet bulb temperature to provide an indication of relative humidity, said psychrometer being characterized in that said scale means includes an elastic strip and said percentage graduations are applied to a central portion of the strip so that said strip extends, when stretched in a uniform manner, proportional to increases in the wet bulb depression.

References Cited in the file of this patent

UNITED STATES PATENTS

| | | |
|---|---|---|
| 1,933,283 | Schwartz | Oct. 31, 1933 |
| 2,260,245 | Wappner | Oct. 21, 1941 |
| 2,293,064 | Kahn | Aug. 18, 1942 |
| 2,681,572 | Lamb | June 22, 1954 |
| 3,048,038 | Johnson | Aug. 7, 1962 |